(No Model.) 2 Sheets—Sheet 1.
D. J. DAVIS.
CENTRIFUGAL SEPARATOR BOWL.
No. 517,603. Patented Apr. 3, 1894.
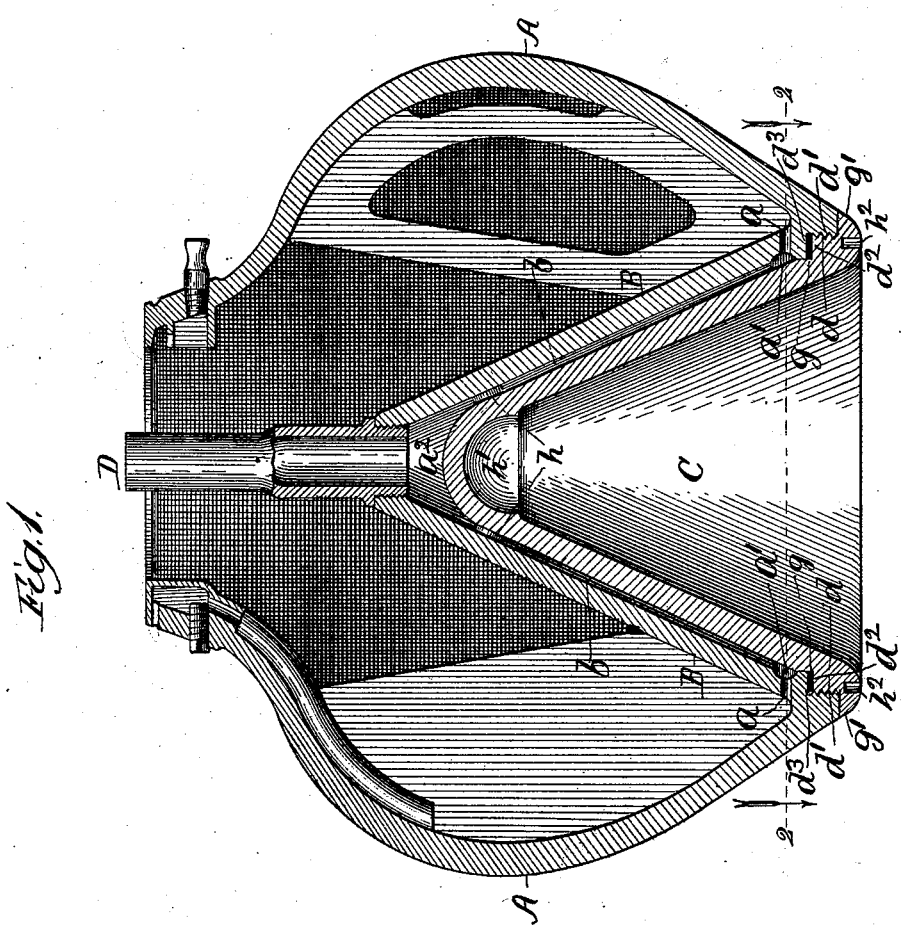

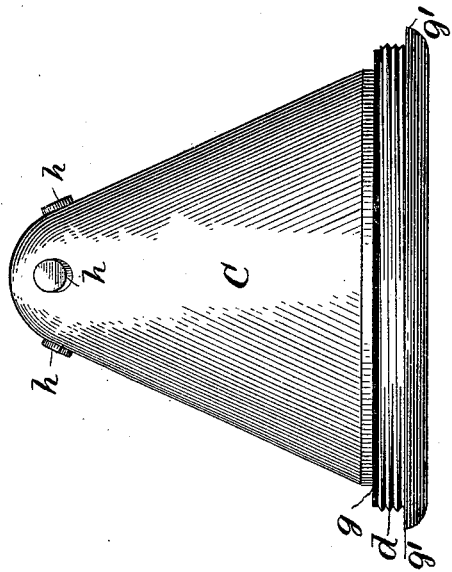
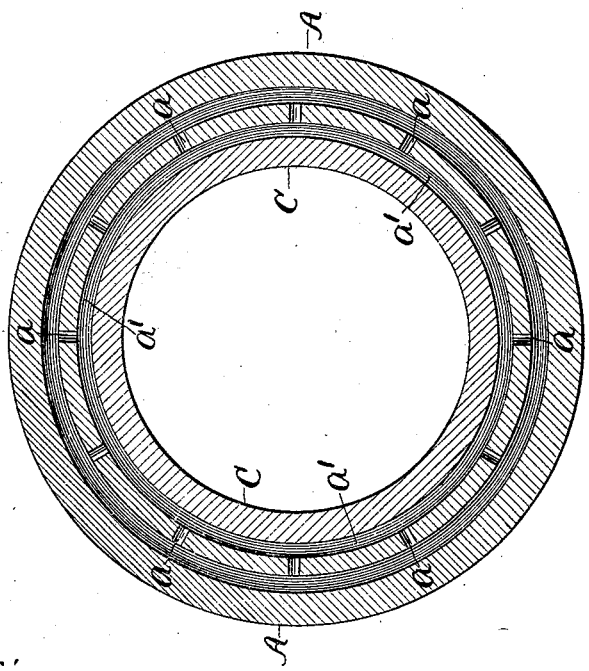

UNITED STATES PATENT OFFICE.

DANIEL J. DAVIS, OF CHICAGO, ILLINOIS.

CENTRIFUGAL SEPARATOR-BOWL.

SPECIFICATION forming part of Letters Patent No. 517,603, dated April 3, 1894.

Application filed May 23, 1892. Serial No. 434,061. (No model.)

*To all whom it may concern:*

Be it known that I, DANIEL J. DAVIS, a citizen of the United States, residing at Chicago, in the county of Cook and State of Illinois, have invented certain new and useful Improvements in Centrifugal Separator-Bowls; and I do hereby declare the following to be a full, clear, and exact description of the invention, such as will enable others skilled in the art to which it appertains to make and use the same.

This invention relates more especially to that class of liquid separators used in creaming milk, and has for its object to facilitate the process by breaking up the volume of full milk at a point between the receiver and the entrance openings into the bowl, by spreading or distributing it over a large area or surface and delivering it into the bowl through a number of apertures. Under the ordinary arrangement the milk is usually delivered into the bowl through a single tube or opening and enters in a stream, creating a current and thereby measurably retarding a quick and thorough separation.

Reference is had to the accompanying drawings, forming a part of this specification, in which—

Figure 1 is a vertical transverse section of a bowl embodying my improved features;
Fig. 2, a horizontal section on line 2, Fig. 1, looking in the direction indicated by the arrows; and Fig. 3, a detached elevation of a conical false bottom.

In the drawings, A is a separator-bowl, B the conical chambered bottom, C a conical spreader or distributer forming a false or auxilary bottom and seated in the chambered bottom of the bowl proper, and D a tubular receiver.

A number of apertures, $a$, open into the bowl through the wall of the conical bottom, as shown in Figs. 1 and 2. These apertures are disposed at intervals in the circumference of the inclosing wall, so that the milk is distributed and enters the bowl at as many different points as there are inlet apertures. Thus the actual process of separation begins the moment the milk enters the bowl, as the volume is broken up before it enters instead of afterward. The milk being delivered at the lowest point and the process of separation beginning at once, all the separating surface of the bowl is utilized and the capacity increased in the same proportion without enlarging the dimensions of the bowl. A finer separation is also effected increasing the percentage of cream. The exterior wall of the conical bottom proper is provided with an annular gathering-groove, $a'$, in line with the inlet apertures, which facilitates the delivery of the milk into the bowl.

The lower end of the tubular receiver, D, is rigidly inserted in and opens through the apex of the conical bottom proper of the bowl into the chamber $a^2$; the milk falling on the apex of the conical false bottom or spreader and being distributed on all sides alike. The milk passes into and follows along down the annular space, $b$, between the walls of the adjacent conical surfaces and finally enters the bowl through the inlet apertures. The inserted conical false bottom is provided with the threaded surface, $d$, which engages with the correspondingly threaded surface $d'$ on the bowl. This cone is also provided with an annular shoulder $d^2$, and the bowl with the corresponding abutting-shoulder $d^3$, so as to form a solid bearing-surface when the conical false bottom is screwed into place. The interposed packing-ring, $g$, assists in forming a tight joint. The conical body forming the false removable bottom terminates in the annular flange, $g'$, which abuts against the lower end of the bowl and conforms to the contour of the same.

The conical body, C, is provided, on its exterior surface just below the apex, (Figs. 1 and 3,) with a number of seated projections, $h$. These projections have a light contact with the adjacent surface of the bowl and serve to maintain the false cone in a true perpendicular position against the action of the centrifugal force.

The bearing-seat, $h'$, in the chambered false bottom receives the spherical end of the driving-spindle on which the bowl is loosely mounted.

The recesses, $h^2$, in the lower end of the false bottom provide for the engagement of pins of a wrench-bar in removing or inserting the false cone.

The conical false bottom may be either permanently or removably inserted in the corresponding part of the bowl.

Having thus described my invention, what I claim as new, and desire to secure by Letters Patent, is—

1. A separator bowl having a conical chambered bottom, a conical false bottom seated in said chamber, an intervening space being left between the adjacent surfaces throughout the length of the chambered bottom, the conical bottom having a number of inlet apertures opening at its base into the bowl, and a receiver opening through the apex of the chambered bottom into the said intervening space; substantially as set forth.

2. A separator bowl having a chambered bottom, a false bottom seated in said chamber, with an intervening space between the adjacent surfaces, said chambered bottom being provided at its base with a series of apertures opening into the bowl, and with a groove following the line of said apertures, and a receiver opening through the apex of the chambered bottom into said intervening space; substantially as set forth.

3. The combination with a separator-bowl, provided with a conical chambered bottom having a number of inlet-apertures opening at the base of the wall of said bottom, of a conical false bottom, inserted in and extending up inside of the chamber in the bottom of the bowl proper, but leaving an annular space between the adjacent surfaces, said false bottom having a close fitting connection at its base with the corresponding part of the base of the bowl below the inlet-apertures, and the receiver-tube, opening down through the apex of the conical bottom and discharging on the corresponding part of the false bottom, whereby the incoming volume is broken up and spread over a large area and made to enter the separating-chamber at as many different points as there are inlet apertures, substantially as set forth.

4. The combination with a separator-bowl, having a conical chambered bottom provided near its base with an annular shoulder and screw threaded below said shoulder, of a conical false bottom, provided with a corresponding abutting shoulder and a screw-threaded surface, whereby said conical false bottom may be removably inserted in the chambered bottom of the bowl proper, substantially as set forth.

5. The combination with a separator-bowl, provided with a conical chambered bottom, of a conical false bottom, seated in said chambered bottom and provided just below its apex with a number of projections, substantially as set forth.

In testimony whereof I affix my signature in presence of two witnesses.

DANIEL J. DAVIS.

Witnesses:
L. M. FREEMAN,
L. B. COUPLAND.